United States Patent
Althaus

(10) Patent No.: US 7,692,327 B2
(45) Date of Patent: Apr. 6, 2010

(54) POWER GENERATING PLANT

(75) Inventor: Rolf Althaus, Herrliberg (CH)

(73) Assignee: Alstom Technology Ltd, Baden (CH)

( * ) Notice: Subject to any disclaimer, the term of this patent is extended or adjusted under 35 U.S.C. 154(b) by 282 days.

(21) Appl. No.: 12/071,572

(22) Filed: Feb. 22, 2008

(65) Prior Publication Data
US 2008/0272597 A1 Nov. 6, 2008

Related U.S. Application Data

(63) Continuation of application No. PCT/EP2006/065189, filed on Aug. 9, 2006.

(30) Foreign Application Priority Data

Aug. 23, 2005 (CH) ................... 1381/05

(51) Int. Cl.
F02K 11/00 (2006.01)
(52) U.S. Cl. ............... 290/52; 290/40 C; 60/226.11
(58) Field of Classification Search ............... 290/52, 290/40 C; 60/226.11
See application file for complete search history.

(56) References Cited

U.S. PATENT DOCUMENTS 5,537,822 A 7/1996 Shnaid et al.
6,276,123 B1 8/2001 Chen et al.
7,388,300 B2 * 6/2008 Anghel et al. ............... 290/39
7,449,795 B2 * 11/2008 Nelson ...................... 290/52
7,462,948 B2 * 12/2008 Toriyama .................. 290/52

FOREIGN PATENT DOCUMENTS

| DE | 195 18 093 A1 | 11/1996 |
|---|---|---|
| DE | 196 21 926 A1 | 12/1997 |
| DE | 10 2004 034 657 A1 | 2/2005 |
| DE | 10 2004 040 577 A1 | 3/2005 |
| EP | 1 564 391 A2 | 8/2005 |
| WO | WO 2006/069948 A2 | 7/2006 |

OTHER PUBLICATIONS

International Search Report dated Dec. 8, 2006.

* cited by examiner

Primary Examiner—Nicholas Ponomarenko
Assistant Examiner—Iraj A Mohandesi
(74) Attorney, Agent, or Firm—Buchanan Ingersoll & Rooney PC

(57) ABSTRACT

During operation of a power generating plant, which essentially comprises a gas turbogroup, a compressed air accumulator, an air turbine which is equipped with at least one generator, the compressed air which is extracted from the compressed air accumulator is directed through a heat exchanger, which acts on the outflow side of the gas turbogroup, and is thermally conditioned there. This compressed air then charges the air turbine, wherein during a "black out" or other shutdown of the power generating plant, the electric current energy which can be obtained by means of the thermally conditioned compressed air in the air turbine, via a power line is used directly for start-up of the gas turbogroup.

11 Claims, 1 Drawing Sheet

POWER GENERATING PLANT

RELATED APPLICATIONS

This application claims priority under 35 U.S.C. §119 to Swiss Application No. 01381/05 filed in the Swiss Patent Office on 23 Aug. 2005, and as a continuation application under 35 U.S.C. §120 to PCT/EP2006/065189 filed as an International Application on 9 Aug. 2006 designating the U.S., the entire contents of which are hereby incorporated by reference in their entireties.

TECHNICAL FIELD

A power generating plant is disclosed.

BACKGROUND INFORMATION

From the prior art, gas turbine power generating plants have become known in which the exhaust gas heat of a gas turbogroup is used for steam generation, wherein the steam can be supplied to multifarious applications. In combined cycle power generating plants, the steam is then expanded in a steam turbine in accordance with requirements, delivering power. The steam turbine drives a generator for power generation.

Furthermore, a recuperative pressurized storage facility has become known, for example from U.S. Pat. No. 5,537,822, in which fluid, especially air, which is stored under pressure in a storage volume, is heated in a heat exchanger by the exhaust gas of a gas turbogroup, and subsequently expanded in a storage fluid expansion machine for driving a generator, delivering power. In principle, very high power outputs can be achieved with this, since during operation under load the compression of the fluid is dispensed with. Consequently, when utilizing the waste heat in a recuperative pressurized storage facility, higher power output potentials result than during utilization in a steam turbine. These potentials, however, are available only as long as expanded fluid is available at a corresponding pressure level in the storage volume.

Such a power generating plant, therefore, does not solve two crucial problems which are very closely linked to its operation. For one thing, the position which is possibly already specified, according to which the potentials are available only as long as expanded fluid is available at a corresponding pressure level in the storage volume.

For another thing, even if this weak point can be eliminated, a further shortcoming still remains, which is associated with the requirement specifically of being able to put such a power generating plant into operation via a so-called "black start".

SUMMARY

A circuit is disclosed which at any time is in the position of directly enabling a black start start-up of the entire power generating plant by means of autonomous means inside the power generating plant.

A method for operating a power generating plant is disclosed, which essentially comprises a gas turbogroup, a compressed air accumulator, an air turbine which is equipped with at least one generator, wherein the compressed air which is extracted from the compressed air accumulator is directed through a heat exchanger, which acts on the outflow side of the gas turbogroup, and is thermally conditioned there, and which compressed air then charges the air turbine, and wherein during a "black out" or other shutdown of the power generating plant, the electric current energy which can be obtained by means of the thermally conditioned compressed air in the air turbine, via a power line is used directly for start-up of the gas turbogroup.

DETAILED DESCRIPTION

Figure 1:
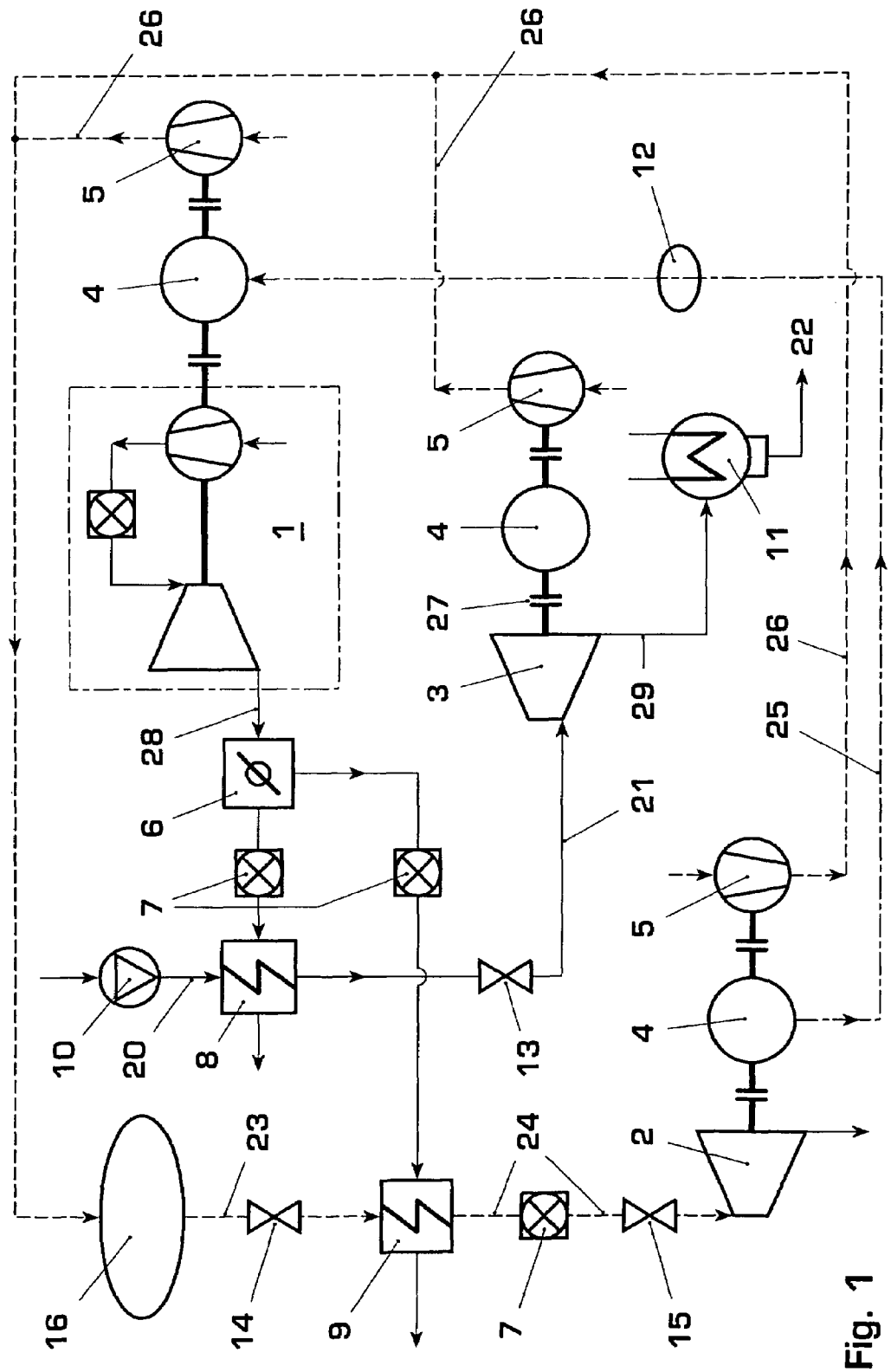
FIG. 1 shows a power generating plant which is constructed for an alternative operation.

The power generating plant which is described for the prior art can be flexibly configured by means of an extension by the gas turbogroup being optionally combined with a steam cycle in such a way that the two cycles, which when individually considered per se are associated with the prior art, are to be brought together in an extremely synergetically and operationally very advantageous way. Such a power generating plant, specifically the gas turbogroup which is to be combined with a steam cycle and with a pressurized storage facility, first of all enables maximum operational flexibility.

The aforementioned weak point of such a power generating plant, which has no autonomy in the case of a "black start" having become necessary, can be eliminated by the potential of the pressurized storage facility being used in such a way that some of the air which is stored there being directed through the heat exchanger which is arranged on the outflow side. This heat exchanger, which is associated with the operation of the power generating plant during the recuperative operating mode via the pressurized storage facility, has an immanent heat potential, so that the air which is extracted from the pressurized storage facility and which customarily is provided with a pressure of at least 60 bar at a temperature of about 30° C., is heated to about 550° C. after flowing through the heat exchanger. The pressure of this thermally conditioned air, however, still remains high, customarily in the order of magnitude of about 55 bar.

Therefore, a high-quality operating air is made available, which is especially well suited for directly operating the storage fluid expansion machine which is associated with the power generating plant. The electric current which is produced via the generator which is coupled to the storage fluid expansion machine is directly used for starting the gas turbogroup, with which a genuine autonomy during start-up after a "black out" is ensured. This is an important contribution during the rapid normalization of the electricity supply in the local district after a "black out", bearing in mind that the power consumption during the start-up of a high-power gas turbine easily requires up to 15 MW.

If the heat exchanger in the case of such a direct demand were to have too little heat storage from the previous operation, this can easily be counterbalanced, for example, by tubular burners being provided which directly engage in such situations and so can quickly produce the heat capacity which is lacking.

By means of the proposals according to the disclosure, a purposeful reaction can be made without time delay during each "black out", and by means of the "black start" which is proposed here an important contribution to the rapid normalization of the whole power supply can be achieved.

Advantageous and expedient developments of the object solution according to the disclosure are characterized in the further dependent claims.

An exemplary embodiment of the disclosure is explained in more detail in the following, with reference to the drawing. All elements which are not necessary for the direct understanding of the disclosure have been omitted. Like elements in the different figures, so far as such are introduced into the method, are provided with the same designations. The flow direction of the media is indicated by arrows.

The power generating plant which is shown in the FIGURE comprises a gas turbogroup 1, a steam turbine 3, and also a compressed air accumulator 16 with an air turbine 2. Both the gas turbogroup 1 and the steam turbine 3 and the air turbine 2 are arranged on a common shaft train, each with a generator 4 and a compressor 5. In this case, switchable clutches 27 are provided in each case between the respective prime mover and the generator, and also between the compressor and the generator. All the generators 4 can preferably also be operated by an electric motor. A flow splitter 6 with a damper is arranged in the exhaust gas flow path of the gas turbogroup 1, which enables the exhaust gas 28 of the gas turbogroup 1 to be selectively directed to a steam generator 8 for the steam turbine 3, or to a gas/air heat exchanger 9. An optional tubular burner 7 is additionally arranged in each case upstream of the steam generator 8 and of the gas/air heat exchanger 9, which enables the thermal capacity which is available in the respective heat exchanger to be increased. The steam turbine 3 and the steam generator 8 are integrated in a manner as known per se in a water-steam cycle. This comprises a feed water pump 10 which delivers feed water 20 under pressure to the steam generator 8. Live steam 21 which is produced there in the heat exchange by exhaust gases 28 of the gas turbogroup 1 is directed via a live steam valve 13 to the steam turbine 3 and expanded there, delivering power. The expanded steam 29 is expanded in a condenser 11 and the condensate 22 is fed back to the feed water pump 10. The compressed air accumulator 16 can be filled with compressed air 26 by means of the compressor 5; in times of high power demand, this air is heated in the gas/air heat exchanger 9 in exchange of heat with the exhaust gas 28 of the gas turbogroup 1, and is expanded in the air turbine 2, delivering power. Also in this case, a tubular burner 7 is optionally provided downstream of this heat exchanger and comes into operation when the air turbine 2 is to be operated alone with the existing compressed air in the compressed air accumulator 16. This, for example, is the case when as a result of a black-out a so-called black start has to be initiated in order to gradually safely establish the electricity supply across connected regions. Such a compressed air storage facility is naturally available for delivering power only over limited periods of time, that is until the pressure in the compressed air accumulator 16 drops below a critical value. The power generating plant which is described here enables, for example, the following modes of operation. In normal continuous operation, one generator 4 is coupled to the gas turbogroup 1. A second generator 4 is coupled to the steam turbine 3. The exhaust gas damper in the flow splitter 6 is correspondingly-positioned so that the exhaust gas 28 of the gas turbogroup 1 is directed to the steam generator 8. The power generating plant then operates in the conventional combined cycle mode for continuous power supply. With falling electric power demand and correspondingly lower electricity prices, the connection is additionally made to the compressors 5 which are arranged on the shaft trains of the gas turbogroup 1 and of the steam turbine 3. It is now possible to distribute the power of the gas turbogroup 1 and/or of the steam turbine 3 between the respective generators 4 and compressors 5. It is furthermore possible to operate the generators 4 by an electric motor at no-load or even for supporting the drive of the compressors 5. The generator 4 of the air turbine 2 can also be additionally coupled to a compressor 5 and operated by an electric motor. In this way, with lower electricity prices, the compressed air accumulator 16 can be very quickly filled, by which an important energy reserve is made available. In times of high power demand and correspondingly high electricity prices, the compressors 5 are shut down. Furthermore, the steam turbine 3 is also shut down. That is to say, all the compressors 5, or rather at least the compressors which are arranged on the shaft trains of the gas turbogroup 1 and of the air turbine 2, are disconnected from the generators 4. The air turbine 2 and the gas turbogroup 1 are connected to the respective generator 4. The exhaust gas damper in the flow splitter 6 is adjusted so that the exhaust gas 28 flows through the gas/air heat exchanger 9. The shut-off component 14, which is arranged downstream of the compressed air accumulator 16, is opened, and consequently compressed air from the compressed air accumulator 16 is directed into the gas/air heat exchanger 9, heated there, and expanded in the air turbine 2 for power generation. A control component 15, which is arranged downstream of the gas/air heat exchanger 9, ensures the desired controlling of the mass flow to the air turbine 2. Naturally, the arrangement which is shown, with its multifarious possibilities of fluid guiding and power distribution, enables a large number of possible further operating variants which the person skilled in the art puts into effect as required and which have not been conclusively represented in this scope.

If for any reason a "black out" now occurs, it is important that a "black start" is directly initiated. For this purpose, the circuit via the compressed air accumulator 16 alone is used, i.e. the power generating plant also provides the possibility, which is described above, of maintaining the operation via a steam cycle so that this circuit is first of all completely bypassed. Only the circuit with the compressed air accumulator 16 is made available.

From this compressed air accumulator 16, the compressed air 23 which is stored there is extracted and is now led directly to the air turbine 2 in accordance with requirements. This compressed air, and, depending upon requirement, by the tubular burner 7 which is arranged there on the outflow side of the gas/air heat exchanger 9, is correspondingly conditioned if the residual calorific content in the gas/air heat exchanger 9 from the previous operation should no longer be sufficient. In any case, the compressed air 24, before charging of the air turbine 2, has sufficient potential both with regard to the thermal and to the pressure-wise potential. The electric current energy 25 which is now produced in the generator 4, which is associated with and coupled to the air turbine 2, is used directly for starting the gas turbogroup 1, as the course of the line 25 shows very well, by which a genuine autonomy during start-up of the power generating plant after a "black-out" is ensured. This is an important contribution to the rapid normalization of the power supply in the local district or across wide connected regions after a "black-out", bearing in mind that this would not be possible without problems because the power consumption during start-up of a high-power gas turbine easily requires up to 15 MW.

The heat exchanger itself, which is associated with the operation of the power generating plant during the recuperative operating mode via the pressurized storage facility, has an immanent heat potential, so that the compressed air 23 which is extracted from the pressure accumulator, which is customarily made available with a pressure of at least 60 bar at a temperature of about 30° C., is heated to about 550° C. after flowing through the heat exchanger. The pressure of this thermally conditioned compressed air, however, still remains high, customarily in the order of magnitude of about 55 bar.

Therefore, sufficient potential for the conditioning of the operating air is made available in order to safely generate that electric current energy which enables starting of the gas turbogroup.

If the heat exchanger, during such immediate demand, were to have too little heat storage from the previous operation, this can easily be counterbalanced, for example, by the already mentioned tubular burner 7 coming into operation, which directly engages in such situations and so can quickly produce the heat capacity which is lacking from the gas/air heat exchanger 9.

Furthermore, a static frequency converter (SFC) 12 for initiating a black start of the plant is provided in the power line 25 for feeding power to the generator 4 which is associated with the gas turbogroup.

A "black start" of the power generating plant, however, is limited not only to a starting aid following a "black out", but engages whenever an autonomous restart is desired.

It will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

List of Designations
1 Gas turbogroup
2 Air turbine
3 Steam turbine
4 Generator(s)
5 Compressor(s)
6 Flow splitter with damper
7 Tubular burner
8 Steam generator
9 Gas/air heat exchanger
10 Feed water pump
11 Condenser
12 Static frequency converter (SFC)
13 Live steam valve
14 Shut-off component
15 Control component
16 Compressed air accumulator
20 Feed water
21 Live steam
22 Condensate
23 Compressed air
24 Thermally conditioned compressed air
25 Power line
26 Compressed air (line)
27 Clutch
28 Exhaust gas
29 Expanded steam

What is claimed is:

1. A method for operating a power generating plant, which essentially comprises a gas turbogroup, a compressed air accumulator, an air turbine which is equipped with at least one generator, wherein the compressed air which is extracted from the compressed air accumulator is directed through a heat exchanger, which acts on the outflow side of the gas turbogroup, and is thermally conditioned there, and which compressed air then charges the air turbine, and wherein during a "black out" or other shutdown of the power generating plant, the electric current energy which can be obtained by means of the thermally conditioned compressed air in the air turbine, via a power line is used directly for start-up of the gas turbogroup.

2. The method as claimed in claim 1, wherein the compressed air from the compressed air accumulator, after flowing through downstream-acting heat exchanger, is subjected to a thermal conditioning by means of a tubular burner before charging of the air turbine.

3. The method as claimed in claim 1, wherein the compressed air from the compressed air accumulator is thermally conditioned either in the heat exchanger or by means of the tubular burner or as well as.

4. The method as claimed in claim 1, wherein the power generating plant is extended by a steam turbine, which in the combined cycle mode is operated with steam which is produced from the exhaust gases of the gas turbogroup.

5. The method as claimed in claim 1, wherein gas turbogroup, air turbine and steam turbine are operated each with a generator and a compressor and in that the respective compressors are used individually or in combination when required or during defined operating states of the power generating plant, for charging the compressed air accumulator with compressed air.

6. The method as claimed in claim 1, wherein the exhaust gases, depending upon operating mode, are used either for conditioning a steam volume in a steam generator, or for thermal conditioning of the compressed air in a further heat exchanger or as well as.

7. The method as claimed in claim 6, wherein the exhaust gases, depending upon requirement, are thermally conditioned via additional tubular burners.

8. The method as claimed in claim 1, wherein the power line is equipped with a static frequency converter.

9. The method as claimed in claim 2, wherein the compressed air from the compressed air accumulator is thermally conditioned either in the heat exchanger or by means of the tubular burner or as well as.

10. The method as claimed in claim 4, wherein gas turbogroup, air turbine and steam turbine are operated each with a generator and a compressor and in that the respective compressors are used individually or in combination when required or during defined operating states of the power generating plant, for charging the compressed air accumulator with compressed air.

11. The method as claimed in claim 4, wherein the exhaust gases, depending upon operating mode, are used either for conditioning a steam volume in a steam generator, or for thermal conditioning of the compressed air in a further heat exchanger or as well as.

* * * * *